Jan. 18, 1938.  E. RAMSAY  2,105,504
METHOD OF MINING COAL
Filed Sept. 9, 1935  3 Sheets-Sheet 1
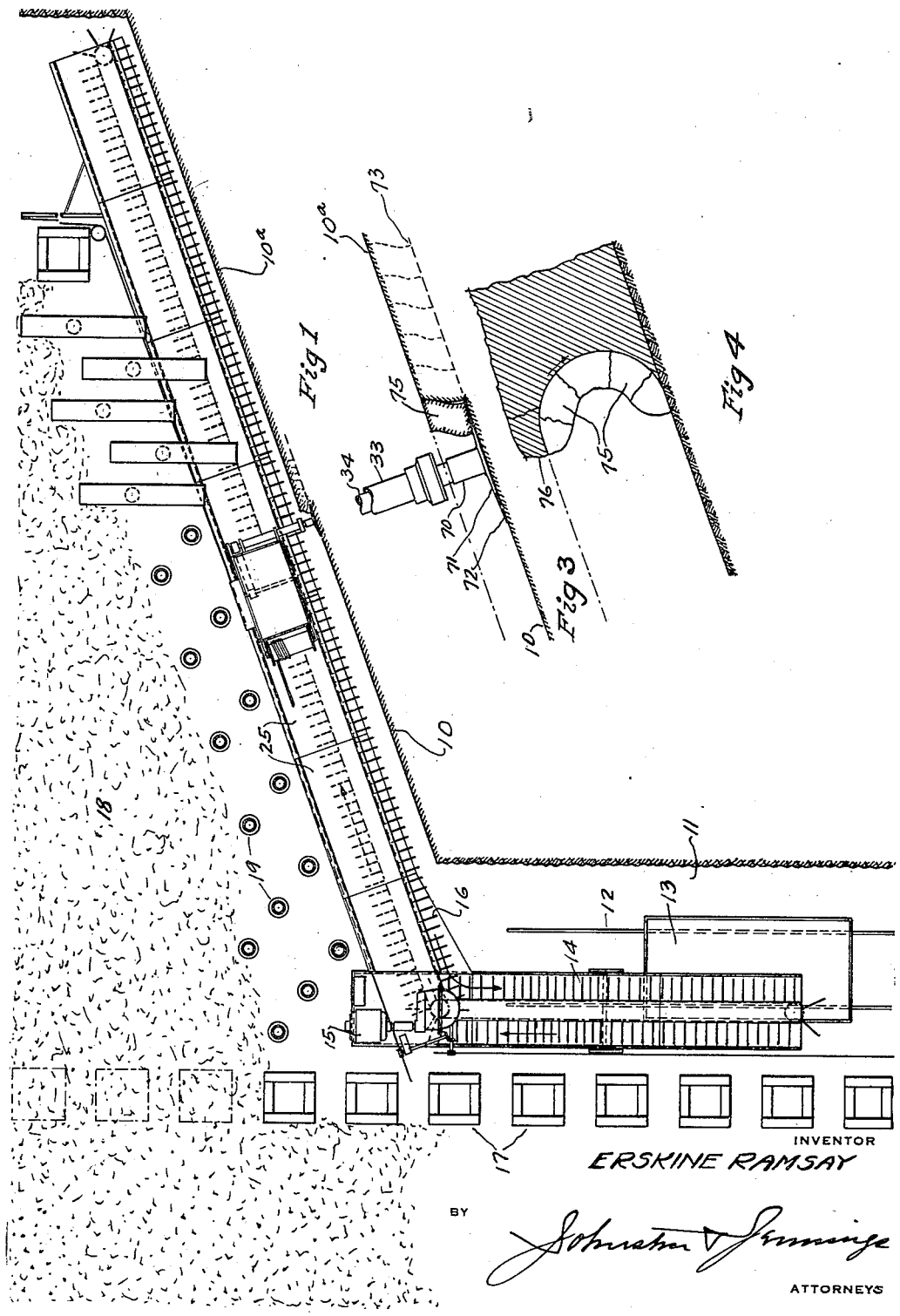
INVENTOR
ERSKINE RAMSAY
BY
ATTORNEYS Jan. 18, 1938. E. RAMSAY 2,105,504
METHOD OF MINING COAL
Filed Sept. 9, 1935 3 Sheets-Sheet 2
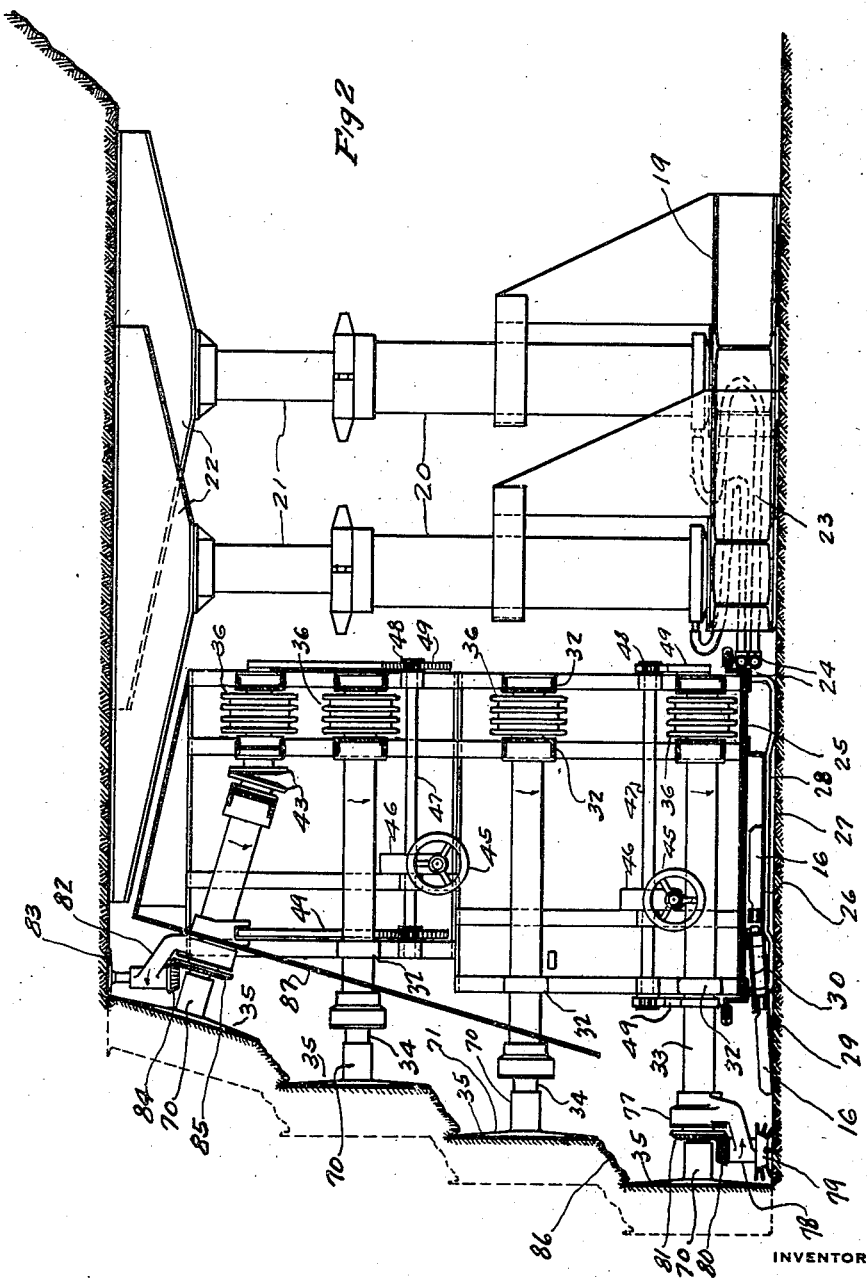
INVENTOR
ERSKINE RAMSAY
BY
ATTORNEYS Jan. 18, 1938.  E. RAMSAY  2,105,504
METHOD OF MINING COAL
Filed Sept. 9, 1935  3 Sheets-Sheet 3
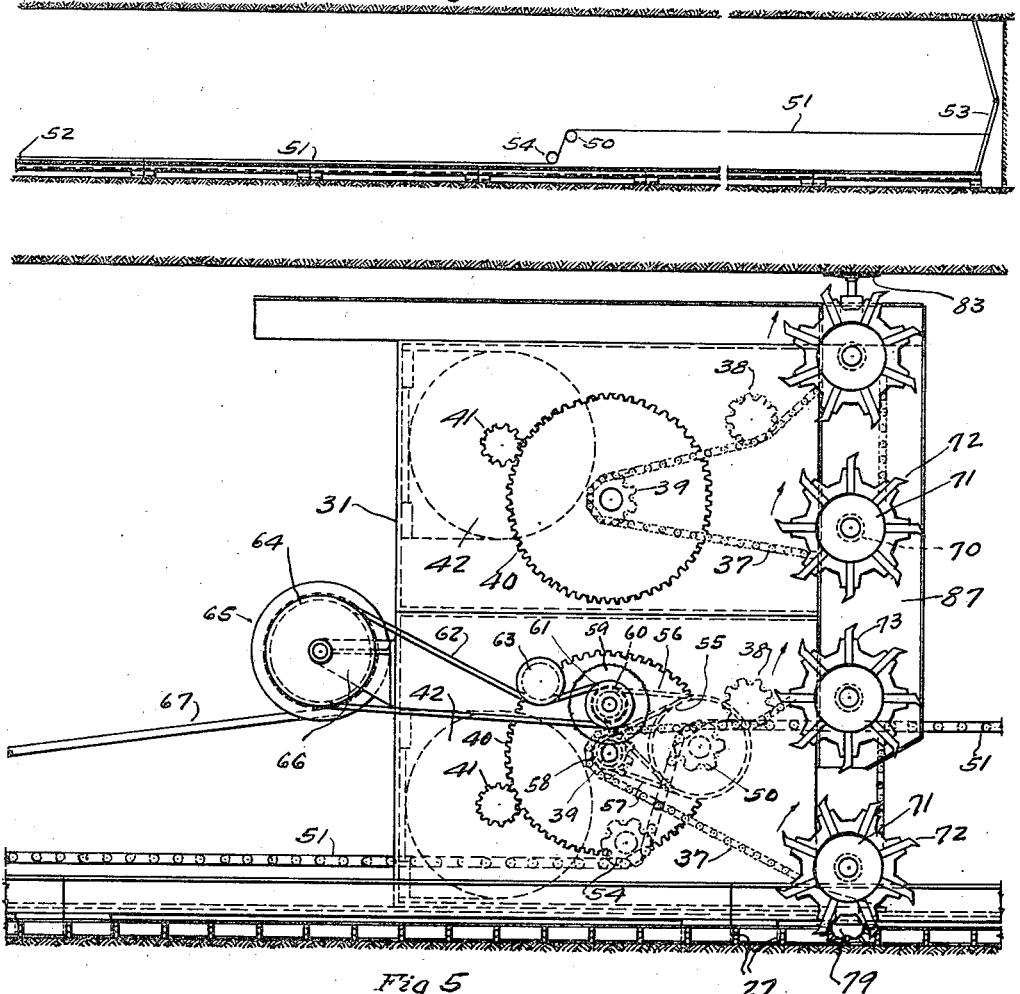
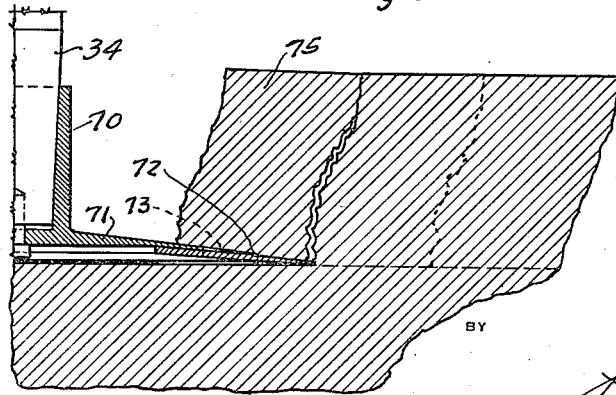
INVENTOR
ERSKINE RAMSAY
ATTORNEYS

UNITED STATES PATENT OFFICE 2,105,504

METHOD OF MINING COAL

Erskine Ramsay, Birmingham, Ala.

Application September 9, 1935, Serial No. 39,707

7 Claims. (Cl. 262—1)

My invention relates to a novel method for mining a mineral body such as coal, characterized by cutting away or slicing off the face lengthwise thereof into slices thin enough to be readily broken off by the advance of the slicing cutters. I shall describe my method more particularly as applied to the mining of coal, but it will be well understood that the term coal includes any body of mineral of a character suitable to be mined by this method.

My invention contemplates that the slices shall be thin and relatively narrow as thereby I reduce the size of the back cutters, using one or more according to the thickness of the seam being worked, and setting them to break off coal as cut across the whole face and cause the coal to fall onto conveyor means without requiring special operations either to bring it down or break it to commercial size, or to load it on the conveyor.

There have been proposals heretofore for mining coal by the employment of a single back cutting saw which was moved along to produce by a deep back cut a thick slab from the whole face to be mined, but a large powerful saw was required with cutter means associated with its shaft to clear a path for it through the slab and with top and bottom cutters to free the slab from the roof and floor. By this method the coal was cut out in large blocks, horizontal saws being used with larger seams to subdivide the slab longitudinally, and wedging or picking elements being provided to break or cut away sections of slab so that the same could be moved away from the face. This practice was expensive, produced a great amount of dust, and brought the coal down in large blocks which had to be again broken to commercial size. As a method it was subject to many other practical objections as a result of which it has not come into commercial use.

I have conceived and by practice demonstrated that a continuous mechanical slicing method of mining can be operated in a practical and commercial way if the coal is cut away, not in large thick blocks or slabs by heavy powerful saws, but in relatively narrow thin slices of such character that they will readily break off and fall responsive to the cutting action of the advancing saw and to the constant roof pressure on the mineral. I have found that this method can be practiced without the necessity of cutting deep top and bottom kerfs to intersect the back cutting saw kerf or kerfs, because it is only necessary on the floor to break away the coal to allow the conveyor to be moved forward which can be done by a small rotary cutter working behind the lower back cutter. As regards the clearing of the roof, this can be accomplished by a small cutter or scraper to remove any coal left clinging to the roof after the passage of the upper back cutter. I thus avoid the necessity present in all previous methods of cutting deep top and bottom kerfs to intersect the back kerf.

In the practice of my improved method I have further conceived the idea of arranging the slice cutting saws so that they are set back progressively from the face as they approach the roof, the advantage in this arrangement being that the coal is cut in steps and each slice, except the bottom one, is left without any under support, which causes it to break off more readily and will afford the additional advantage of leaving the saw kerfs open below so that they will clear themselves more readily of dust which otherwise might collect behind the saws and bind them.

A further advantage of this step method of slicing off the face lies in the fact that conveyor means for continuously removing the mineral as it is mined, can be brought into position where the coal will fall by gravity thereon as it is broken off from the face and thus all handling of the coal is eliminated.

A further particular advantage of this step method of slicing lies in the fact that it supports the roof to a position well in the rear of the forward cutters and enables roof props to overhang from behind the mining machine so as to almost reach the face and afford very effective protection overhead to men and machinery against falling roofs.

My invention further contemplates cutting the slices by a traveling cutting machine mounted to move rapidly back and forth parallel with the face and which is adapted to cut in either or both directions according to the conditions in which it is at work, and which has its saws designed and mounted so that they produce a wedging action away from the face of the coal that is effective, as the slice is freed, to break it away in advance of the saw shaft.

My mining method has the further advantage that in breaking away the thin slices, the breaks run outwardly from the saw so that the coal comes down in commercial size lumps that do not require to be broken up.

The provision of a plurality of slice cutters enables them to be set to clear any partings in the coal.

My invention further comprises mechanism for carrying into effect the mining methods heretofore described and which is illustrated in the accompanying drawings, in which:—

Fig. 1 is a plan view of a portion of a coal mine showing the measures being mined in accordance with my improved method, part of the roof props being shown in plan and part broken away for the sake of clarity.

Fig. 2 is a side elevation of mechanism for carrying into effect my improved method of mining, the face being shown as sliced off by the step method with the advantages thereby accruing for the better supporting of the roof being illustrated.

Figs. 3 and 4 are detail views showing the manner in which the slicing saws act to cut and break off the coal ahead of them.

Fig. 5 is a front elevation of the slicing machine similar to that shown in side elevation in Fig. 2, except that as here shown all four cutters are arranged in the same vertical plane.

Fig. 6 is a diagrammatic view showing the feed chain and propelling sprockets for moving the machine along the face.

Fig. 7 is an enlarged detail view showing the wedging action of the saw teeth and the way that the coal slice is broken off by them.

Similar reference numerals refer to similar parts throughout the drawings.

In Fig. 1 I use a conventional showing of a coal mine in which 10 represents the face of the coal to be mined and 11 is a typical haulage way having a track 12 therein for mine cars 13 which are adapted to assume position under an elevating and loading conveyor 14 which is driven by a motor 15 and disposed to receive the coal continuously, as it is mined, from the conveyor 16 which runs parallel with the face 10 and is driven by the same motor 15. Both conveyors are preferably of the endless type, but any suitable conveyor mechanism may be employed. Cribs 17 are provided along the haulage way to support the roof which however is allowed to fall as gob 18 behind the roof supports which follow up behind the working face, as it is cut.

These roof supports are illustrated in Fig. 2 and comprise bases 19 which support hydraulic cylinders 20 having plungers 21 which carry roof engaging elongated caps 22 which are adapted to overhang the mining machine and support the roof well forward of the machine's driving elements. These cylinders 20 are supplied with hydraulic pressure by a flexible hose 23 connected to pressure supply lines 24 extending along the back edge of the conveyor pan sections 25 which form a track way for the mining machine.

These pans carry Z-bars along their front and rear edges which serve as guides for the slicing machinery which will be later described. The pans are supported above the mine floor 26 by a series of shoes 27 which are suitably connected to the main pan sections 25 and to the under pan sections 28 which house between them the return flight of the endless conveyor 16. The working flight of this conveyor travels along on an apron 29 hinged to the forward edge of the under pans 28 and adapted to rest freely on the floor forward of the pans so that the working flight of the conveyor 16 will slide along over the same, the flights of the conveyor being guided and held spaced by longitudinal guide and support elements generally indicated by the numeral 30. With this arrangement, only the working flights of the conveyor are exposed and these extend forwardly in juxta-position to the face 10 being mined.

A suitable mechanism for slicing the face, in accordance with the practice of my present process, is illustrated more clearly in Figs. 2 and 5 and comprising a suitable frame work 31. This carries along its forward side overhung bearing brackets 32 in which I mount tubular housings 33 for the shafts 34 of the slicing saws 35. Between the rear bearing brackets I mount the multiple sprockets 36, one for driving each of the shafts 34; these sprockets being driven by chains 37, which preferably pass about the sprockets on an adjacent pair of shafts 34 and under an idler 38 to a drive sprocket 39 driven by a gear 40 from a pinion 41 driven by a motor 42. A separate motor is provided for driving each pair of shafts 34 through the drive described. In case it is desired to incline the top drive shaft 34, as shown in Fig. 2, a universal joint or bevelled gears 43 may be employed to take the drive from the sprocket 36 for the upper shaft.

As shown in Fig. 2, I provide a separate adjustment for the upper and lower drive shafts 34, each adjustment comprising a hand wheel 45 driving through worm gearing 46 a shaft 47 suitably mounted on the frame of the machine and carrying at each end a pinion 48 meshing a rack 49 which is connected to the bearings for its respective shaft, thereby permitting the shaft to be raised and lowered at will to accommodate the machine to variations in seam thickness and to the presence of partings, if such exist. It is understood that this adjustment can be supplied to all of the back cutter shafts, if desired.

The machine is intended to slide along on the inner flanges of the Z irons on the pans 25 and to be propelled back and forth by means of a driving sprocket 50 engaging a stationary chain 51 attached at 52 to the delivery end conveyor pan and at its other end to the jack 53 that is braced between the floor and roof at the far end of the working face 10. This chain passes from low level about an idler 54 to the drive sprocket 50 and thence at a higher level to the jack 53. The sprocket 50 is driven through a sprocket clutch 55 having a reversible drive by a chain 56 in one direction and in the other direction by a chain 57. This chain 57 is driven by the drive shaft for the lower sprocket 39. The chain 56 is driven by a pinion 58 meshing a gear 59 which carries a sprocket 60 for the chain 56 and carries also a sheave 61 for a rope drive 62 which passes under an idler 63 and about a sheave 64 on a drum 65 mounted at the rear of the machine. The drum is suitably mounted in brackets 66 and there is coiled about it an electric conductor cable 57 which supplies current to the motors 42 which drive the machine. The drum is rotated to take up and pay off the cable as needed to follow the machine movements back and forth along the face 10.

Upon each shaft 34 I mount the hub 70 for a slicing saw cutter. This hub, as is shown more clearly in Fig. 7, carries a slightly conical flange 71 with a taper provided on its back face and with the front countersunk face lying in a plane normal to the axis of its drive shaft. In the peripheral edge of this flange are provided suitable spline extensions 73 for the saw bits or teeth 72 and it will be understood that these bits or teeth are thin and present tapered cutting edges which as shown in Fig. 7 are inclined away from the face. They produce a kerf as thin as is practical and at the same time they apply to the severed slice as outward wedging pressure, due to their taper, which acts to break the slice off in segments about the saw as it progresses. It will be obvious that not much dust will be formed by such a cutting operation.

Referring now to Figs. 3 and 4, it will be seen that the saws are set to cut each a relatively thin slice such as is shown clearly by the cut away portion of the face 10 in Fig. 1 and is indicated between the plane 73 for the back cutting saw kerf and the front face 10a left by the previous cut. It will be seen that as a saw cuts its kerf, the slice which it frees from the face 10, if not wedged off by the teeth 72, must gradually ride up upon the conical hub flange of the saw which will exert sufficient pressure outwardly on the free edge of the slice to break it off. This action of teeth and/or hub flange results in the radial breaking away of the free edge of the slice into sections such as are indicated at 75 in Figs. 3 and 4, it being noted that these sections tend to break off substantially radially from the hub. This joint action of slicing and wedging serves to keep the slice as it is freed from the face broken away ahead of each saw shaft and this break will run up to intersect any coal that is left between the kerfs of adjacent saws. Such breaking away of the interposed coal section is indicated at 75 in Fig. 4. In this way the kerfs can be cut in spaced relation and yet the cutters will act to break away the interposed body of coal left between the kerfs, as well as the sliced coal, as the machine advances.

As the sliced coal is broken way it will fall by gravity to the foot of the face and there be engaged by the working flights of the conveyor 16 and continuously moved to the point of discharge.

The housing 33 for the lower cutter carries fast thereon a bracket 77 having an underhung vertical bearing 78 in which is mounted the drive for the bottom cutter 79, this cutter being driven by the gears 80 and 81, the latter being on the lower drive shaft 34. This cutter 79 works to remove any coal left adhering to the floor after the lower slice has been broken away by its advancing cutter, and will also scrape off irregularities in the floor so that the conveyor apron and the sectional pan can be readily advanced to follow the receding face.

The housing on the upper cutter shaft carries a bracket 82, similar to 77, in which I mount the drive shaft for the top horizontal cutter 83 working along the roof, this cutter being driven by gears 84 and 85 from the upper drive shaft 34. The cutter 83 follows behind the top slicing cutter and removes any coal left adhering to the roof. The cutters 79 or 83 are not called upon to cut horizontal kerfs into the coal in advance of the slicing cutters but merely to follow up behind those cutters to remove irregularities left along floor and roof.

In Fig. 2 I show what I regard as the preferred manner of practicing my method and here the cutters 35 are shown progressively set back as they approach the roof, with the top cutter also set at an upward incline. This leaves undercut benches of coal 86, corresponding in depth to the thickness of the slices and it will be seen that the coal being sliced by each back cutter is thus left free of any under support. This also leaves each saw kerf free to clear itself and the coal free to fall as it is broken away from the slice, this breaking action, responding both to the wedging action of the cutters as well as to the roof pressure exerted downwardly on the stepped face, tends continuously to break the coal down ahead of the back cutter shafts. This arrangement has the advantage of bringing the working flights of the conveyor further forward under the face being mined so that much coal will readily fall directly on to the conveyor, and I provide a deflector 87 to deflect the coal as it is broken loose by the upper cutters away from the underlying machinery and onto the conveyor.

By reference to Fig. 2 is will be apparent this stepped cut brings the face of the coal at the roof well back from the lower bench of the face and it permits the overhung prop caps 22 to reach over the machine almost to the face, thus affording support for the roof very close to the face and overhanging the major part of the sectional pan and slicing machine.

In operation, the slicing machine is capable of rapid travel back and forth upon its pan supports and as it advances it slices off the face as shown in Fig. 1 and breaks it down, while the endless conveyer 16 constantly removes the coal as it is mined. When the machine reaches the end of the face 10, assuming that the conditions are not suitable for it to make a back cut, it is reversed and run back quickly to the mine way 11, the pans are moved forward the depth of the cut and the machine is again advanced along the face to remove and break down another slice. As this slicing and breaking down operation proceeds, the roof props are moved forward in to follow the receding face and as they move forward they leave the roof behind them unsupported and free to fall and form the gob 18. As the face 10 recedes, the cribs or timbers are removed and the loading conveyor 14 is advanced and the loading proceeds continuously.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

While I have referred to the back cutting saws as designed and adapted to produce an outward wedging pressure upon the severed slice, it is to be understood that this represents only the preferred embodiment, inasmuch as the saws, without being specially designed to produce a wedging action, will nevertheless exert a disrupting effect or force on the slice, if the same be thin enough, which will cause it to break off responsive to the cutting action of the advancing saw. Since economy of operation is of prime importance, it will be obvious that the advantage will lie with the construction which will permit the maximum thickness in the slice and yet enable the slice to be broken away by the advance of the saw without other treatment of the mineral face. It will further be noted that the effect of the stepped method of cutting will produce all of the advantages of the customary undercut without, however, producing the same as a separate operation, inasmuch as the position of the back cutting saws in slicing away the coal in benches will produce in effect an undercut and will do so with the added advantage that the undercut is of such character that the conveyor is in position under the overhang and thus receives the severed material directly upon it without the necessity of handling by labor or mechanism which is otherwise necessary when the coal is brought down from an undercut vertical face.

What I claim is:—

1. The herein described method of mining a mineral body, which consists in simultaneously sawing a series of relatively thin slices at different levels from its working face by a working force applied parallel with said face and breaking away the slices from each other and the face by a working force which is a component of the wedging action and which exerts an outward wedging pressure applied by the advance of the slicing saws along the face thereby to continuously slice and break off the whole face.

2. The herein described method of mining a mineral body, which consists in simultaneously sawing a series of relatively thin vertical slices at different levels from an unbroken working face by a working force applied parallel with and in juxtaposition to the face and breaking away the slices by outward wedging pressure applied substantially normal to the face by the advance of the slicing saws along the face thereby to continuously and progressively slice and break off the face along radial lines from, and in advance of, the saw axis throughout the vertical extent of said face.

3. The herein described method of mining a mineral body, which consists in simultaneously cutting a series of relatively thin vertical slices at different levels from its working face and breaking away the slices by outward wedging pressure applied by the advance of the slicing cutters thereby to continuously slice and break off the face along a plurality of levels, the slices being cut in stepped relation so that each slice, as it is broken out, leaves the face immediately above it overhanging and unsupported.

4. The herein described method of mining a mineral body, which consists in making a stepped series of vertical kerfs along its face to produce slices of a thickness adapted to be broken away by the advance of the slice cutters, with the kerfs being spaced apart both vertically and horizontally and set progressively forward as they approach the floor the horizontal spacing being determined by the thickness of the slice of the particular mineral being mined which will break off responsive to a wedging action of the advancing cutter.

5. The herein described method of mining a mineral body, which consists in cutting a stepped series of kerfs behind its face to cut therefrom slices of a thickness adapted to break away responsive to outward pressure by the advancing slice cutters, spacing between kerfs being such that the interposed body of mineral will break away between kerfs responsive to a wedging action of the kerf cutters.

6. The herein described method of mining coal, which consists in moving a series of back cutting slicers along the face to be mined, with the slicers progressively set back as they approach the roof and with the thickness of the slices such that the advance of the slice cutters will cut off and break away the slices as formed.

7. The herein described method of mining coal, which consists in moving back slicing cutters set at different levels parallel with the face to be mined and stepped to undercut said face into benches, leaving the roof load imposed on the stepped face and breaking away the slices radially into sections by the slicing cutters so as to leave their kerfs open below and the coal forming each slice free of any under support.

ERSKINE RAMSAY.